UNITED STATES PATENT OFFICE.

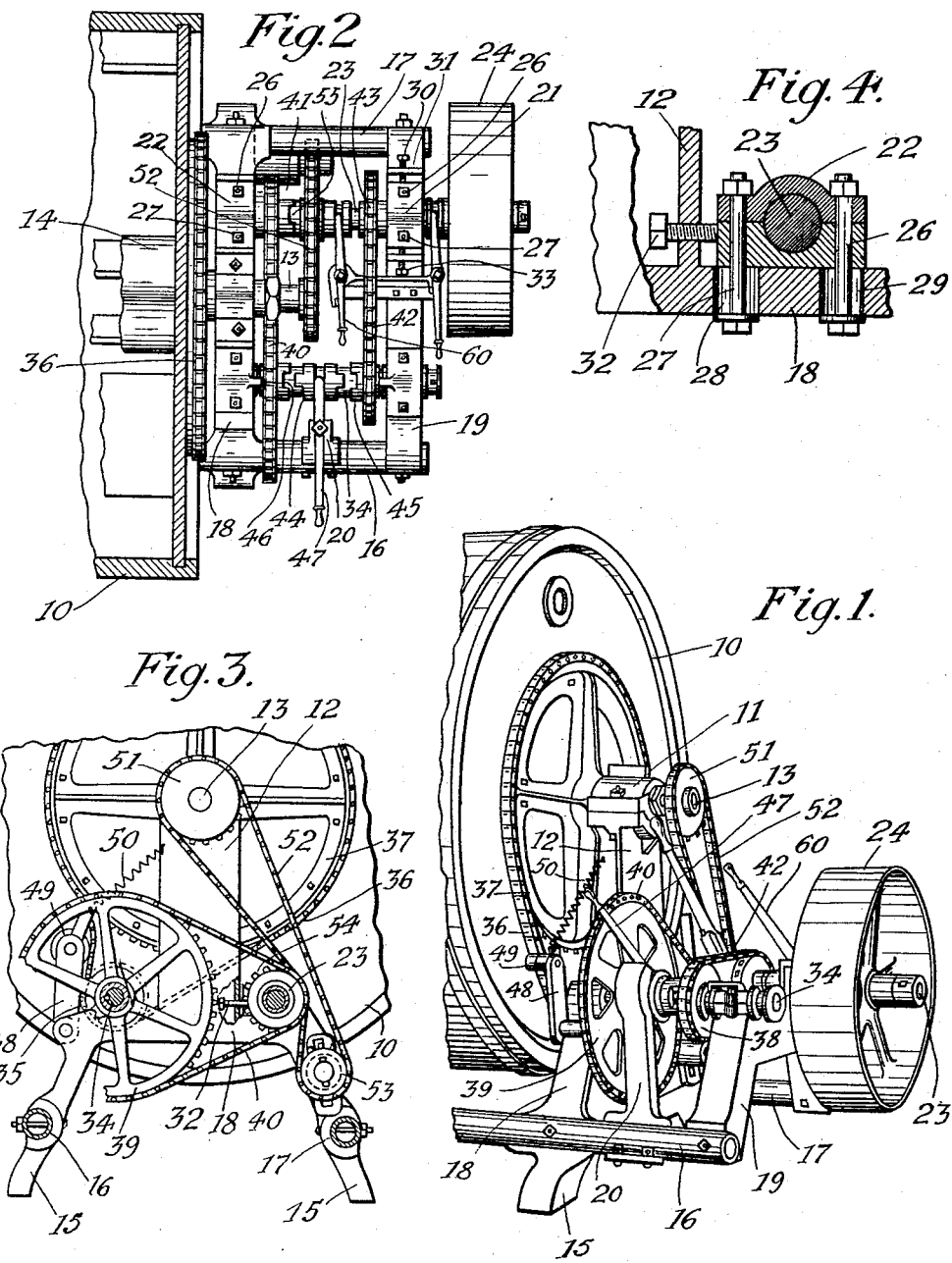

LEVI A. DISBROW, OF OWATONNA, MINNESOTA.

DRIVING MEANS FOR CHURNS.

1,177,689.  Specification of Letters Patent.  Patented Apr. 4, 1916.

Original application filed August 28, 1913, Serial No. 787,112. Divided and this application filed March 1, 1915. Serial No. 11,260.

*To all whom it may concern:*

Be it known that I, LEVI A. DISBROW, a citizen of the United States, residing at Owatonna, in the county of Steele and State of Minnesota, have invented certain new and useful Improvements in Driving Means for Churns, of which the following is a specification.

My invention relates to driving means for churns and has for its object to provide a simple and efficient transmission which will be positive in action and shall provide means for rotating the churn drum at a plurality of speeds and for rotating the central roller therein in opposite directions to that of the drum.

This application is a division of my co-pending application Serial Number 787,112, filed August 28, 1913.

The full objects and advantages of my invention will appear in connection with the detailed description thereof and are particularly pointed out in the claims.

In the drawings, illustrating the application of my invention in one form,—Figure 1 is a perspective elevation view of the churn driving mechanism. Fig. 2 is a plan view of the parts shown in Fig. 1. Fig. 3 is a sectional end elevation with some parts broken away. Fig. 4 is a detail sectional view of one of the boxes.

The driving means herein illustrated are shown as applied to a cylindrical churn 10 carried on trunnions journaled in bearings 11 formed on standards 12, the trunnions being hollow and having a shaft 13 extended through the same, a rotary beater 14 being mounted on the shaft 13 within the drum 10. It will be apparent, therefore, that there are provided two rotatable members, 10 and 14, one within the other, and the driving mechanism herein described provides means for differentially and independently rotating these two members.

The driving mechanism and the standards 12, above referred to, are supported upon legs 15, upon which are secured rods 16, 17. Upon these rods are arched brackets 18, 19, the standard 12 being mounted upon the bracket 18. An upright standard or bracket 20 is also secured to rod 16, and these members provide the means for supporting the several parts of the driving mechanism.

Journaled in bearings 21 and 22 on arched brackets 18 and 19 is a main driving shaft 23 having thereon a pulley 24 by which the same may be operated from any desired source of power. As clearly shown in Figs. 2 and 4, the bearings 21 and 22 are adjustably mounted, being secured to brackets 18 and 19, respectively, by means of bolts 26 and 27 which extend through the bearing boxes and through slots 28 and 29 in the respective brackets 18 and 19. The bearing box 21 is adapted to be adjustably positioned by means of a set bolt 30 extending through a web 31 of bracket 19, while bearing box 22 is correspondingly positioned by means of a set bolt 32 extending through a portion of upright 12, as best shown in Fig. 3. These set bolts are at the back of the bearing boxes so as to receive the force of the pull upon the shaft through the sprocket chains of the transmission. The outside box 21 is provided with an additional set bolt 33 for steadying the box against the forward strain coming from the pulley 24. By means of these set bolts the entire shaft 23 and the parts carried thereby may be adjusted bodily to the desired extent, thereby tightening the various sprocket chains which run into the shaft and which will be hereinafter described.

The churn or cylinder 10, that is the outer driven element, is driven from a counter shaft 34 journaled in bearings on brackets 18 and 19 parallel with drive shaft 23. Counter shaft 34 has fast thereon a sprocket wheel 35 from which runs a sprocket chain 36 to a large sprocket wheel 37 fast on the end of drum 10. Loose on shaft 34 are two sprocket wheels 38 and 39, respectively, of unequal diameter. The larger sprocket wheel 39 is connected by means of a sprocket chain 40 with a sprocket wheel 41 fast on drive shaft 23, and sprocket wheel 38 is connected by a sprocket chain 42 with a sprocket wheel 43 fast on drive shaft 23. The sprocket wheels 41 and 43 may be of the same diameter. It will be apparent, therefore, that the sprocket wheels 38 and 39 on counter shaft 34 will be constantly driven, and, due to their different diameters, at different rates of rotation.

As best shown in Fig. 1, a double-faced clutch 44 is splined on counter shaft 34, one face of said clutch being adapted to engage with a clutch face 45 on the hub of sprocket wheel 38, while the other face of clutch 44 is adapted to engage with a clutch face 46 on the hub of sprocket wheel 39. The clutch 44 is controlled by a clutch lever 47 pivoted to the stand 20. When clutch 44 is engaged with clutch face 45 the drum will be driven at high speed. When the engagement of clutch 44 is with clutch face 46 the drum will be driven at relatively low speed. When the clutch 44 is in neutral position between the clutch faces 45 and 46 the drum will be stationary. The drive in each case is through the sprocket chain 36 and over the sprocket wheel 37, as illustrated in Figs. 1 and 2. To prevent back lash I have provided a tightener member coöperating with sprocket chain 36, as described and claimed in the said copending application, which comprises an arm 48 engaging roller 49 and spring 50.

The central roller 14 above described is provided on its shaft 13 with a sprocket wheel 51 over which runs a sprocket chain 52, which sprocket chain runs over an idler sprocket 53 adjustably mounted upon the lug 15, as clearly shown in Fig. 3. A sprocket wheel 54 is loose on shaft 23 and has the hub thereof provided with a clutch face 55 adapted to engage with a complemental clutch face on the hub of the sprocket 41 fast on shaft 23. The sprocket 54 is controlled by clutch lever 60. As shown in Fig. 3, the sprocket chain 52 engages the sprocket wheel 54 with one of its runs. When the sprocket wheel is slid along shaft 23 so as to bring the clutch 55 into inoperative position said run of chain 52 will be displaced somewhat sidewise, but under such conditions the chain will be stationary. When the clutch is moved into its operative position, where it engages the clutch face on the hub of sprocket 41, the run of the sprocket chain 52, which meshes with the sprocket wheel 54, will be held in proper alinement with the other run and the chain will be driven so as to rotate sprocket wheel 51 and roller 14 on shaft 13 in a direction opposite to that in which the churn or drum is being rotated.

The simplicity and efficiency of my transmission and driving mechanism will be apparent. All parts are exposed so as to be readily available for lubrication, cleaning or repair. Easily accessible means are provided for adjusting the parts so as to tighten the driving chains. The double-speed drive for the churn is very desirable and under perfect control, and the central roller is adapted to be held stationary or driven reversely to the drive of the drum, as desired.

I claim:

1. Driving mechanism for two members one within the other driven to rotate in relatively different members, comprising a drive shaft, two sprocket wheels fast on said drive shaft and a sprocket wheel loose on the drive shaft, means connected with said loose sprocket wheel for rotating the inner member, a counter shaft, means connected with said counter shaft for rotating the outer member in the opposite direction to the inner member, two sprocket wheels of unequal sizes loose on said counter shaft having driving connections respectively to the two fast sprockets on the drive shaft, means for connecting the loose sprocket wheel on the drive shaft to rotate with the drive shaft at will, and means for connecting the counter shaft to rotate with either of the loose sprocket wheels thereon at will.

2. Driving mechanism for rotary members, comprising a supporting frame work, a drive shaft and a counter shaft mounted in parallel relation on said framework, a two-speed sprocket chain transmission on said drive shaft through the counter shaft to the rotary member, bearing boxes for said drive shaft slidably mounted upon the supporting framework, set bolts at the back of each of said bearing boxes for moving the same to tighten the sprocket chain, a pulley on the end of the drive shaft, and a set bolt at the outside of the box adjacent said pulley for holding the drive shaft against reverse action by the pulley.

3. Driving mechanism for two members one within the other driven to rotate in relatively different manners, comprising a drive shaft and a counter shaft mounted in parallel relation, means under the control of the operator for effecting direct driving connection between the drive shaft and one rotary member, means for driving the other rotary member from said counter shaft, a pair of gears fast on the drive shaft, a pair of gears of unequal sizes loose on the counter shaft, sprocket chains connecting said respective sets of gears, and means for connecting said counter shaft to rotate with either of said loose gears at will.

In testimony whereof I affix my signature in presence of two witnesses.

LEVI A. DISBROW.

Witnesses:
CARL K. BENNETT,
G. B. BENNETT.

Copies of this patent may be obtained for five cents each, by addressing the "Commissioner of Patents, Washington, D. C."